Figure 1:
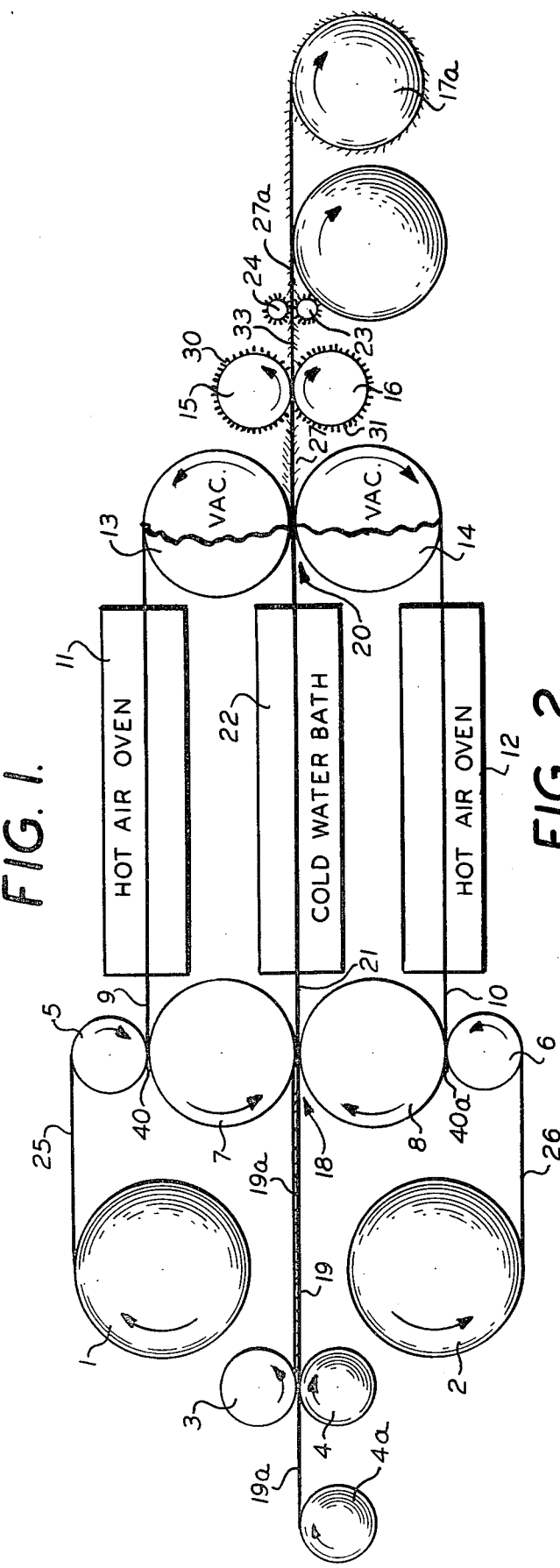
Figure 1:
Figure 1:
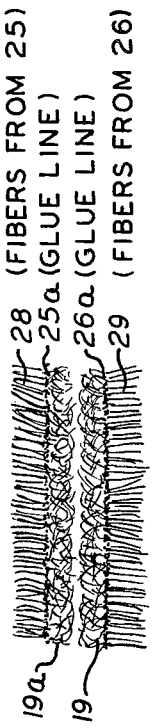

United States Patent [19]

Forrest

[11] 4,124,428
[45] Nov. 7, 1978

[54] PROCESS OF MAKING SYNTHETIC SUEDE

[76] Inventor: Norman Forrest, 216 Byram Rd., Byram, Conn. 10573

[21] Appl. No.: 826,629

[22] Filed: Aug. 22, 1977

Related U.S. Application Data

[63] Continuation-in-part of Ser. No. 738,918, Nov. 4, 1976, Pat. No. 4,044,183.

[51] Int. Cl.² ............................ B32B 33/00; D06C 11/00
[52] U.S. Cl. ........................................ 156/243; 156/245; 156/246; 156/247; 156/322; 428/91; 428/95; 428/315; 428/425; 428/904
[58] Field of Search ............... 156/72, 153, 154, 242, 156/243, 245, 246, 247, 285, 288, 306, 311, 322, 324; 264/162; 428/91, 95, 304, 315, 317, 320, 425

[56] References Cited

U.S. PATENT DOCUMENTS

| | | | |
|---|---|---|---|
| 3,098,262 | 7/1963 | Wistozky | 156/322 |
| 3,582,430 | 6/1971 | Benigno | 156/322 |
| 3,709,752 | 1/1973 | Wistozky et al. | 428/320 |

*Primary Examiner*—Caleb Weston
*Attorney, Agent, or Firm*—Lawrence Rosen; E. Janet Berry

[57] ABSTRACT

Process for making a synthetic suede product, two rolls at a time, each roll consisting of a web of fibrous material, to the upper side of which is attached outwardly extending polyurethane fibers. The process consists of continuously feeding two thin films of polyurethane into the nips formed by two rotating heated cylinders wherein the two feed materials are forced into two flexible molding bands provided with a multiplicity of molding cavities by pressing the film against a heated silicone roller. Most of the urethane film fills the cavities and forms a fibrous surface when removed, leaving a very thin layer in molten state which becomes glued to the upper layers of fibrous webs which are passed into a second set of nips formed by two rotating heated cylinders. The fibrous material or fabric may be man-made such preformed woven, knitted, foamed, non-woven, spun bonded, spun laced, etc.

8 Claims, 3 Drawing Figures

FIG. 2. (CROSS SECTION AT NIP 18)

FIG. 3. (CROSS SECTION AT 33)

PROCESS OF MAKING SYNTHETIC SUEDE

RELATED APPLICATION

This application is a continuation-in-part of Ser. No. 738,918 filed Nov. 4, 1976 now U.S. Pat. No. 4,044,183.

The present invention relates to a process for preparing simultaneously two rolls of an improved synthetic suede product having two outer polyurethane layers provided with outwardly extending fibers and a fibrous material substrate. The two rolls of simultaneously prepared suede product of this invention have the appearance and feel characteristic of genuine leather suede used in the manufacture of garments.

BACKGROUND OF THE INVENTION

There have been many attempts in recent years to produce a commercially acceptable synthetic suede-like product. Such materials have been sought primarily for the manufacture of various garments such as dresses, suits, rainwear, and the like. Natural suede has been used for such purposes, but it is a relatively expensive material and often represents the major portion of the costs of making the garments. Moreover, natural suede has the disadvantage of readily showing dirt or other spots on its surface and therefore requires constant cleaning and brushing to maintain its attractive appearance. Natural suede is also easily stained, and such stains are difficult if not impossible to remove without damaging the original appearance and feel.

Some of the process proposed heretofore for the preparation of synthetic suede are described in U.S. Pat. Nos. 2,835,607; 3,098,263; 3,141,051; 3,190,947; 3,3116,592; 3,655,497; and 3,705,226. The prior art processes have a number of serious disadvantages; the main problem in most instances being the failure of the synthetic suede product to have properties which are sufficiently similar to natural suede so that the consumer is satisfied. In other instances, the processing procedures are so complicated and involved that the final synthetic product is as expensive, if not more expensive, than natural suede. A number of the prior art processes have the disadvantages of requiring the use of expensive apparatus and/or a large number of processing steps.

U.S. Pat. No. 3,705,226 which pertains to a method for preparing the so-called "Ultrasuede" involves a relatively large number of processing steps, chemical impregnations, and solvent treatments. It would be desirable therefore to have a process available for producing a comparable synthetic suede product which did not require so many processing steps, chemical impregnations, and solvent treatments.

In designing a sueded material for use in apparel, the sine qua non is drapability or flexibility in order to be accepted. It is virtually impossible to make a flexible or drapable product even using a very drapable or flexible fibrous web such as a knitted fabric or a thin woven fabric as a base or substrate, if any coating is applied which strikes through the fibers and locks them into place. This makes the product stiff because the fibers can't move in relation to each other. In recent years successful coating on fabrics which are drapable have been effected by coating a film on a transfer paper and then very gently laying on to the fabric a gelled coat or a solution coat to effect adhesion of only the top layer of the fibers.

The known synthetic suede products generally are prepared by forming a woven or non-woven substrate from fibrous or textile materials; coating said substrate with a solution, plastisol or film of plastic material; and then fiberizing the resulting adherent coating by such conventional means as sueding, brushing, grinding, napping, shearing, etc.

One object of the present invention is to provide an improved process for the manufacture of synthetic suede which avoids disadvantages of the prior art processes.

Another object of the present invention is to provide a continuous process for the simultaneous manufacture of two rolls of synthetic suede by a series of sequential steps that do not include chemical and/or solvent treatments.

A further object of the present invention is to provide an outstanding synthetic suede product having surfaces with outwardly extending, non-tapered fibers and body characteristics having the hand, drape, moderate yield and slow recovery qualities normally associated with genuine leather suede.

These and other objects of the present invention are acheived by the discovery that an improved synthetic suede product can be manufactured in a continuous manner by supplying two separate polyurethane feed materials into the first two nips formed by two rotating, heated cylinders carrying two endless, flexible molding bands provided with a multiplicity of minute molding cavities. These two feed materials are polyurethane films a major portion of which form the outwardly extending fibers when they are forced by the first nips into the molding cavities. The other two feed materials are performed fibrous fabrics or materials such as previously woven, knitted, foamed, non-woven, spun bonded, or spun laced material. The latter feed materials form the base or substrate of the improved suede product of this invention. The latter feed materials and the remainder of the polyurethane films are subject to elevated temperatures and pressures while being passed though a second set of nips. The exposed polyurethane films are in a molten or seim-molten condition and serve as an adhesive or glue to affix the outwardly extending fibers or hairs on both outer surfaces of the two separate bases or substrates.

These features of the invention will be best understood from the following description of one type of apparatus suitable for carrying out the process of this invention as shown in the accompanying drawing in which FIG. 1 is a diagramatic elevational view of apparatus for carrying out the invention;

FIG. 2 is a cross-sectional view of the product formed in the nip and prior to the flow of the molten polyurethane into the cavities of the two molding bands; and FIG. 3 is a cross-sectional view of the synthetic suede product produced by the process of this invention.

Referring to FIG. 1, two unsupported and non-reinforced silicone rubber molding bands 9 and 10, which are preferably unsupported and non-reinforced, are shown. The outer surfaces of molding bands 9 and 10 are specially prepared to provide a multiplicity of minute cavities (not shown) for forming the fibrous, suede-like surfaces of the resulting synthetic product. The cavities are about 0.030 inch deep with a diameter of about 0.001 inch and are somewhat slanted in different directions relative to the outer surfaces of molding bands 9 and 10. The cavities may number about 20,000 or more per square inch.

Molding bands 9 and 10 are positioned over rotating cylinders 7 and 8, respectively, one one end and on rotating cylinders 13 and 14, respectively, on the other end. All four cylinders are power driven. Cylinders 7 and 8 are heated internally to a temperature of about 400° F. by means of a hot oil source (not shown) to ensure retention of the precise molding temperature and to exert pressure. It is also possible to provide suitable means such as a weighted roll (not shown) to compensate for the expansion of the molding bands when exposed to heat as well as to insure that the molding bands are kept tracking properly.

Two rolls of unsupported polyurethane film, 25 and 26 are fed from rolls 1 and 2 respectively, and passed over preheating cylinders, 5 and 6, which are internally heated with hot oil by suitable means (not shown) to a temperature of about 400° F. Cylinders 5 and 6 are preferably covered with a material such as silicone rubber, tertrafluoroethylene fluorocarbon resins or fluorinated ethylene-proplylene resins sold under the trademark Teflon to prevent sticking. Cylinders 5 and 6 act as applicating rolls to press polyurethane films 25 and 26 against preheated molding bands 9 and 10, respectively, and to force or squeeze at pressure points 40 and 40a a major portion of the polyurethane film, which is a molten or semimolten state, into the cavities in the molding bands. A portion of the polyurethane film remains on the surface and serves as the adhesive for affixing the fibers to the substrates. This is an important feature of the present invention. Molding bands 9 and 10 are preheated to a temperature of about 350° to 410° F. by passage through conventional hot air ovens 11 and 12 respectively.

As the thus treated polyurethane films 25 and 26 are passed around cylinders 7 and 8 respectively, into nip 18 formed by cylinders 7 and 8, two fibrous substrates 19 and 19a unwound from rolls 4 and 4a are also fed into nip 18.

In nip 18 the separate feed materials are squeezed at a moderate pressure of from about 65 to 100 psi. At this point the surface or exposed polyurethane films are in a molten condition and are laminated or affixed to the substrates. The polyurethane feed material that has previously filled the cavities forms exact replicas of the cross section depth and slant of the fibers which exist on the material from which the cavity surfaces were formed on the molding bands.

Following passage of the composite feed materials through nip 18, the resulting layered product 21, sandwiched between molding bands 9 and 10, is passed through water bath 22 to lower the temperature of the complete assembly to a temperature of from about 72° to 100° F.

When the complete assembly i.e., molding bands 9 and 10 are layered product 21, reaches nip $2_0$ formed by rotating cylinders 13 and 14, the latters internal vacuum hold molding bands 9 and 10 tightly against the outer surfaces of cylinders 13 and 14 respectively, which facilitates the subsequent stripping operation. Cylinders 15 and 16, which are covered with card clothing, grip the resulting separate layers of synthetic products 27 and 27a with fibrous surfaces and strip the multiplicity of fibers from the matrices of molding bands 9 and 10. If cylinders 13 and 14 are not provided with internal vacuums, the stripping force would pull the molding bands off cylinders 13 and 14 and tear them.

Stripping cylinders 15 and 16 are geared together with the carding staples 30 and 31 arranged to penetrate synthetic products 27 and 27a from both directions gripping products 27 and 27a positively and at the same time perforating the polyurethane film glue lines 25a and 26a surfaces with a multiplicity of tiny holes to provide greater breathability than unperforated polyurethane and to enhance water vapor transmission.

The resulting perforated synthetic suede products 33 and 33a are next brushed by tampico brushes 23 and 24 to brush the surface fibers over any holes that may be visible as a result of the perforation treatment at cylinders 15 and 16, and then wound on roll 17 and 17a, respectively.

FIG. 2 shows a cross-sectional view of the assembly 21 of the feed materials at the time of pressing at the nip 18 comprising the outer polyurethane films 25 and 26 and the substrates 19 and 19a. It will be understood that this cross-sectional view does not show that portion of the molten outer polyurethane films that has previously flowed into the multiplicity of cavities provided in the contacting surfaces of molding bands 9 and 10.

FIG. 3 shows a cross-sectional view of the endless synthetic suede products 27 and 27a produced in accordance with the process of this invention after being brushed. Fibers 28 and 29 are obtained from polyurethane film 25 and 26, respectively, while the glue lines are indicated by 25a and 26a; and the substrates are indicated by 19 and 19a. It will be understood that the multiplicity of perforations caused by carding staples 30 and 31 are not shown in this cross-sectional view.

The two endless molding bands employed in the above described apparatus for carrying out the process of the present invention are composed of a tough, tear resistant silicone rubber such as those commercially available under the tradenames RTV 664 manufactured by General Electric and Silastic manufactured by Dow-Corning. The molding bands are individually formed by centrifuging a measure amount of precatalyzed silicone rubber inside a steel drum the inside surface of which is covered with a length of coated nylon equivalent in length to the length of molding band desired. The exposed surface of this material is provided with flocked fibers of, for example, 5.5 denier rayon about 0.03 to 0.04 inch in length. These flocked fibers are applied to the surface of the material by conventional electrostatic and beater bar procedures. The molding bands useful in the practice of this invention will have a Shore Hardness value of from about 60 to 73, preferably approximately 70, as measured by a durometer.

The centrifuging step is carried out by initially admixing RTV 664A and RTV 664B silicone rubbers, dispensing the resulting mixture inside a balanced steel drum with open sides, and then certrifuging at a peripheral speed of about 3000 feef per minute for 4 hours. The amount of silicone rubber or rubbers employed will be at least sufficient to produce a finished molding band measuring about 0.05 inch in thickness. This centrifuging method permits the use of a tough silicone rubber, which must be precatalyzed in order to effect polymerization; allows for the release of entrapped air fom the silicone rubber without using a vacuum; and yields an endless molding band or belt, with no seams or join marks, having a precise thickness.

In accordance with one feature of the invention it has been found essential to have the thickness of the silicone molding bands at an absolute minimum in order to achieve commercially acceptable speeds. The mass of the silicone rubber molding bands is very important, since the heat transfer of the silicone rubber is poor and this will determine the length of the machine as well as the speed of production in carrying out the process which involves both heating and cooling steps. The thickness of the molding bands should therefore range from about 0.035 to 0.055 inch, which will be about 0.005 to 0.015 inch thicker then the length of the surface fibers being molded. Preferably, the thickness of the molding band should be approximately 0.05 inch which is about 0.02 inch thicker than the length of the fibers.

It has also been found that in order to attain the commercially acceptable speed of about from 2 to 6 yards per minute no reinforcement can be employed in conjunction with the silicone rubber. If the back of the molding band is reinforced, the molding band will warp excessively due to the expansion of the patterned surface. If a central reinforcement is employed to avoid such warping, an equal amount of the silicone rubber must be cast on the back thereof to equalize the expansion and keep the molding band or belt flat. Such an expedient doubles the weight of the silicone rubber and undesirably reduces production speed at least 50 percent.

The diameter of the molding bands may range from about 8 to 24 feet, and preferably about to 12 to 14 feet. Although the diameters may vary depending upon the type of production sought, in general diameters greater than about 12 feet would require apparatus beyond 18 feet long which is impractical in most instances from a commercial standpoint. The width of the molding bands will generally range from about 36 to 72 inches, preferably from about 48 to 64 inches.

As will be understood, the speed of the two silicone rubber molding bands are synchronized and will move at a rate of from 2 to 6 yards per minute. Although the maximum speed will vary greatly depending upon the apparatus employed, a speed of greater than about 10 yards per minute would not provide sufficient time for the requisite preheating and cooling treatments. The polyurethane film which is employed as the outer or surface layers of the synthetic suede product of this invention are preferably of the polyester based thermoplastic type characterized by a very tough abrasion resistant and semi-rigid composition. Examples of such materials include the Tuftane polyester based polyurethane sold by the B. F. Goodrich Co. Specific examples of such material are Tuftane 310, Tuftane 312, Tuftane 322, and Tuftane 330. Other polyester based polyurethane film manufactured by the B. F. Goodrich Co. are sold under the Estane brand name. Films or sheets made from Hi-Tuff polyurethane sold by J. P. Stevens & Co. may also be utilized for this purpose. In general, the polyurethane film will have a width in the range of about 36 to 77 inches, preferably from about 56 to 64 inches. A thickness of about 0.004 inch is especially preferred. For most purposes the width of the polyurethane will be substantially the same as the molding bands. The polyurethane films will generally be preheated to a temperature within the range of about 350° to 410° F.

At least 50% of the original thickness of the outer or surface polyurethane films become the fibers or "hairs" of the final synthetic suede product of this invention. Thus, for example, with polyurethane film feed material having a thickness of 0.004 inch as much as about 0.0035 inch thereof will become the surface fibers. The glue lines will generally range in thickness from about 0.005 to 0.001 inch.

As described above, at least two separate fibrous web materials are fed to the nip between the two outer polyurethane films. The former serve as the substrates of the products of this invention. The fibrous webs or sheets used for this purpose will generally have a thickness of from about 0.005 to 0.02 inch.

The width of the substrate will be substantially the same as the two outer polyurethane layers. In addition, the inner or central layer may be preheated to a temperature of from about 385° to 410° F. prior to being passed into nip 18 to ensure that the glue lines formed from the two outer polyurethane films become affixed to the substrates.

The rate of feeding the outer and substrate layers to nip 18 is synchronized with the speed of the molding bands to provide a continuous flow of the four separate feed materials to nip 18. It would also be possible to prejoin the layers of feed material in a separate machine at higher speeds and then to heat the resulting composite as described below to obtain the unique synthetic suede products of this invention.

As also previously described, the molding bands are heated to a temperature of from about 385° to 410° F. prior to contacting the feed materials. This preheating step can be carried out using conventional hot air ovens for each molding band. Following passage through nip 18 and while containing the compressed feed materials, the molding bands are cooled to a temperature at least sufficient to solidify the surface fibers, the latter being still in molding bands. This cooling can be readily accomplished by passing the molding bands through a cold water bath maintained at a temperature of from about 32° to 50° F.

After being withdrawn from the cold water bath the resulting compressed assembly of feed materials containing surface fibers is stripped from the molding bands by the use of a pair of power driven cylinders covered with card clothing. The stripping cylinders are geared together with the carding staples penetrating the synthetic suede assembly from both directions thereby gripping the suede assembly. As previously discussed, the carding staples may perforate the polyurethane glue lines with a multiplicity of minute holes which enhance the breathability of the final product. The carding staples preferably are about 0.125 to 0.250 inch in length and are positioned substantially perpendicular from the surface of cylinders 15 and 16. The density of the staples will be about 150 to 300 per square inch. In accordance with the description of the process of this invention set forth above the stripping operation is facilitated by maintaining power driven cylinders 13 and 14 under an internal vacuum. The degree of vacuum will vary from about 6 to 24, preferably from about 10 to 20 inches of mercury.

Prior to being wound on suitable power driven cylinders the resulting synthetic suede products of this invention may be subjected to a separate brushing treatment to ensure the surface fibers or hairs cover the minute perforations that may be visible. It will be understood however, that the brushing step is not essential or may be carried out in a separate operation just prior to commercial use of the suede product. When brushing is desired it may be accomplished by the use of a pair of tampico brushes. Other available procedures may obviously be employed to brush the surface fibers prior to wind-up.

The synthetic suede product of this invention if characterized by outstanding abrasion resistance and highly desirable tracking and lay down of the surface fibers or hairs when a finger is moved across the surface thereof as in the finest genuine suede made of unborn calf skins. The diameters and length of the surface fibers will generally vary from about 0.0005 to 0.0015 inch and from about 0.0010 to 0.050 inch, respectively. The relative stiffness of the outer polyurethane film feed materials is also important. If a softer polyurethane material is employed the fibers would feel gummy and would not stand up or track. Furthermore, the use of a softer polyurethane film feed material would give surface fibers which would tend to pill. On the other hand, if the polyurethane film feed material is too stiff the resulting surface fibers or hairs would be undesirably harsh to the touch.

The synthetic suede product or layered assembly of this invention also will have the following characteristics:

Density of Surface Fibers; Average 10,000 to 200,000 per square inch

Thickness, Average: 0.008 to 0.060 inch

Width: 36 to 65 inches

For the manufacture of certain products the polyurethane materials used as the outer layers may be replaced by polyolefinic feed materials such as ethylene-vinyl acetate co-polymers, cross-linked polyolefins, polyvinyl chloride, and the like.

While certain embodiments of this invention are discussed above, it will be understood that the invention is obviously subject to other variations and modifications without departing from its broader aspects.

What is claimed is:

1. A method of continuously and simultaneously producing two separate rolls of a synthetic suede product which comprises the following sequential step:
   (a) continuously feeding two polyurethane films onto two separate preheated, endless silicone rubber molding bands, the outer surfaces of which are provided with a multiplicity of cavities, and forcing a major portion of each of said polyurethane films into said molding band cavities;
   (b) continuously feeding the thus treated polyurethane films into a nip formed by two rotating cylinders, while simultaneously feeding two separate webs of fibrous material into said nip in between the polyurethane films to provide substrates;
   (c) continuously compressing the resulting assembly in said nip at a temperature of from about 385° to 410° F. and at a pressure of from about 65 to 100 psi whereby the remaining portion of the polyurethane films become affixed to adjacent substrate material;
   (d) continuously passing the assembly compressed between molding bands into a cold water bath maintained at a temperature sufficiently cold to solidity any molten polyurethane feed material;
   (e) continuously stripping the assembly composed of two separate layers, each layer comprising a substrate and outward extending polyurethane fibers affixed thereto, from the molding band by passing the molding bands over a pair of rotating cylinders provided with an internal vacuum and gripping the separate layers with a pair of rotating cylinders covered with card clothing; and
   (f) continuously winding up two rolls of the stirpped layers having outwardly extending fibers affixed to the outer surfaces of the substrates and constituting said synthetic suede product.

2. The method of claim 1 wherein said molding bands are preheated to a temperature within the range of 385° to 410° F.

3. The method of claim 1 wherein said polyurethane film is a polyester-base thermoplastic polyurethane film.

4. The method of claim 1 wherein said substrate is a knitted fabric web.

5. The method of claim 1 wherein said substrate is a spun laced polyester web.

6. The method of claim 1 wherein said outer polyurethane film layers are preheated to a temperature of from about 385° to 410° F. prior to being passed into said nip.

7. The method of claim 1 wherein said cold water bath is maintained at a temperature of from about 32° to 50° F.

8. The method of claim 1 wherein the fibrous surfaces of said stripped layers are brushed prior to being wound up on rotating cylinders.

* * * * *